United States Patent
Gaide et al.

(10) Patent No.: US 12,505,068 B2
(45) Date of Patent: Dec. 23, 2025

(54) TILED COMPUTE AND PROGRAMMABLE LOGIC ARRAY

(71) Applicant: XILINX, INC., San Jose, CA (US)

(72) Inventors: Brian C. Gaide, Erie, CO (US); Sneha Bhalchandra Date, San Jose, CA (US); Juan J. Noguera Serra, San Jose, CA (US)

(73) Assignee: XILINX, INC., San Jose, CA (US)

( * ) Notice: Subject to any disclaimer, the term of this patent is extended or adjusted under 35 U.S.C. 154(b) by 184 days.

(21) Appl. No.: 18/215,668

(22) Filed: Jun. 28, 2023

(65) Prior Publication Data

US 2025/0004983 A1    Jan. 2, 2025

(51) Int. Cl.
G06F 15/80 (2006.01)
H03K 19/177 (2020.01)
H03K 19/17736 (2020.01)

(52) U.S. Cl.
CPC .................. *G06F 15/803* (2013.01)

(58) Field of Classification Search
None
See application file for complete search history.

(56) References Cited

U.S. PATENT DOCUMENTS

| | | | |
|---|---|---|---|
| 2019/0115920 A1* | 4/2019 | Zhang | H10B 20/00 |
| 2020/0365593 A1 | 11/2020 | Chen et al. | |
| 2021/0050300 A1* | 2/2021 | Lin | H01L 23/3128 |
| 2021/0288034 A1 | 9/2021 | Kim et al. | |
| 2023/0059491 A1* | 2/2023 | Dokania | H01L 23/49811 |

FOREIGN PATENT DOCUMENTS

KR    20220002401 A    1/2022

OTHER PUBLICATIONS

International Search Report and Written Opinion for PCT/US2024/034407 dated Oct. 8, 2024.

* cited by examiner

*Primary Examiner* — Anh Q Tran
(74) *Attorney, Agent, or Firm* — Patterson + Sheridan, LLP

(57) ABSTRACT

Examples herein describe a three-dimensional (3D) die stack. The 3D die stack includes a programmable logic (PL) die and a compute die stacked on top of the PL die. The PL die includes a plurality of configurable blocks and a plurality of first electrical connections on a top side of the PL die. The compute die includes a plurality of data processing engines and a plurality of second electrical connections on a bottom side of the compute die. The three-dimensional die stack includes a plurality of tiles, each tile comprising M configurable blocks included in the plurality of configurable blocks and N data processing engines included in the plurality of data processing engines.

18 Claims, 11 Drawing Sheets

TILED COMPUTE AND PROGRAMMABLE LOGIC ARRAY

TECHNICAL FIELD

Examples of the present disclosure generally relate to integrated circuit (IC) devices, and more specifically, to a tiled compute and programmable logic array.

BACKGROUND

Increasingly, high-performance computing systems implement large numbers of data processing engines and programmable logic (PL) (e.g., a field-programmable gate array or "FPGA") within the same die and/or integrated circuit (IC) package. Such systems generally provide a flexible and highly parallel computing interface that can be adapted to a wide variety of applications. However, the architectures implemented in current systems suffer from a number of drawbacks.

For example, such systems commonly implement network-based communications in which data processing engines communicate with programmable logic and other IC components via an edge interface. One drawback of this configuration is that, as more and more processing elements need to communicate through an edge interface, the routing channels associated with the edge interface become saturated. As the routing channels approach saturation, routing congestion increases, limiting bandwidth and/or increasing latency between data processing engines and programmable logic. Additionally, due to routing congestion, data processing engines and programmable logic positioned far away from an edge of the interface may have difficulty meeting timing closure requirements, effectively limiting the total number of resources that can be utilized for a given process.

SUMMARY

Techniques for implementing a three-dimensional (3D) die stack. The 3D die stack includes a programmable logic (PL) die and a compute die stacked on top of the PL die. The PL die includes a plurality of configurable blocks and a plurality of first electrical connections on a top side of the PL die. The compute die includes a plurality of data processing engines and a plurality of second electrical connections on a bottom side of the compute die. The three-dimensional die stack includes a plurality of tiles, each tile comprising M configurable blocks included in the plurality of configurable blocks and N data processing engines included in the plurality of data processing engines.

One example described herein is a computing system. The computing system includes a memory and a three-dimensional (3D) die stack coupled to the memory. The 3D die stack includes a programmable logic (PL) die and a compute die stacked on top of the PL die. The PL die includes a plurality of configurable blocks and a plurality of first electrical connections on a top side of the PL die. The compute die includes a plurality of data processing engines and a plurality of second electrical connections on a bottom side of the compute die. The three-dimensional die stack includes a plurality of tiles, each tile comprising M configurable blocks included in the plurality of configurable blocks and N data processing engines included in the plurality of data processing engines.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
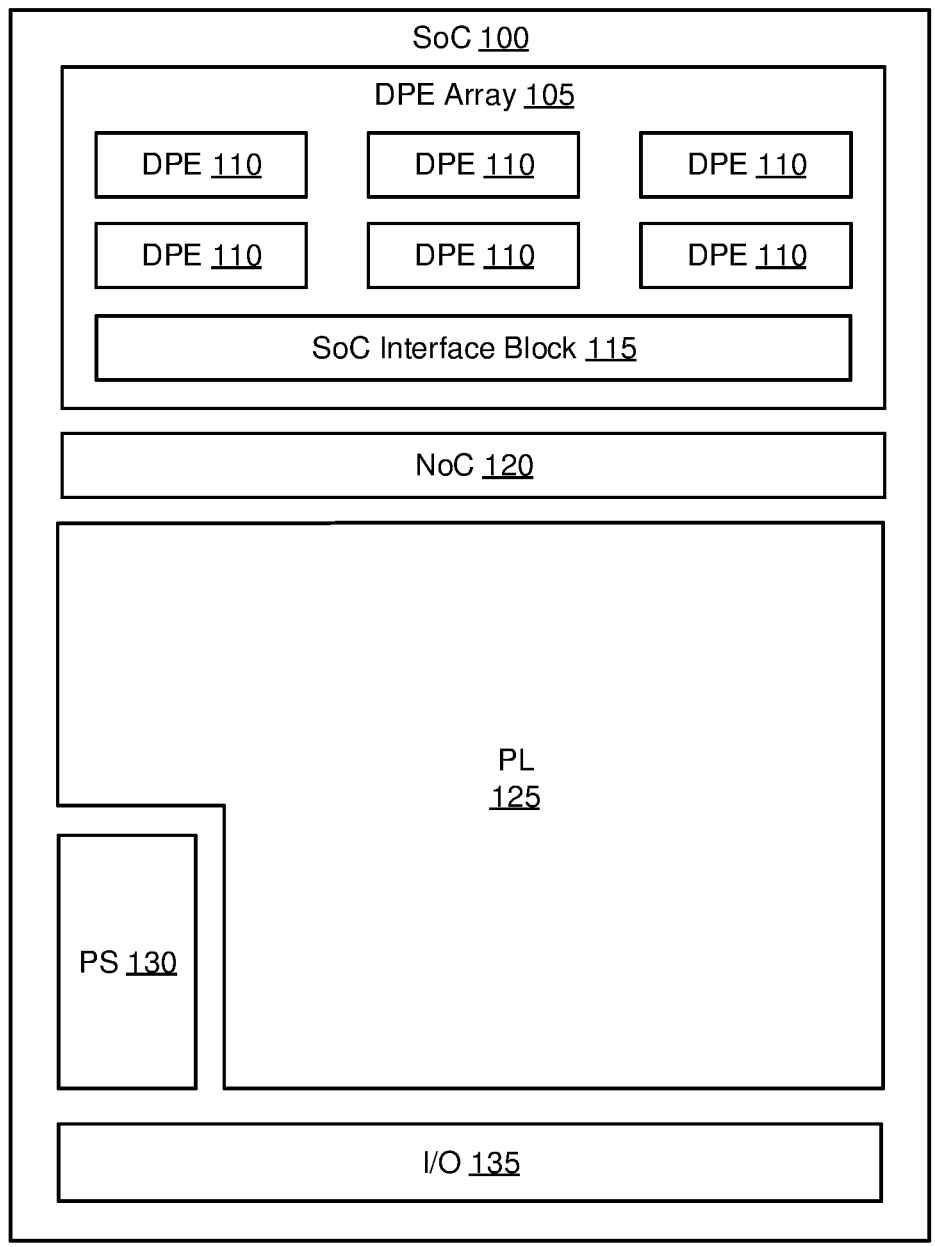
FIG. 1 is a block diagram of a SoC that includes a data processing engine array and programmable logic, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques that implement a tiled compute and programmable logic (PL) (e.g., a field-programmable gate array (FPGA), programmable logic device(s) (PLD), and/or any other type of logic device that is reprogrammable). In various embodiments, the techniques may include vertically aligning, in a three-dimensional integrated die stack, data processing engines (e.g., DPEs 110) included in a compute die with programmable elements (e.g., CLBs 310) included in a programmable logic (PL) die 300. Electrical connections (e.g., through-silicon vias)

included on the bottom of the compute die may be pitch-matched and bonded to electrical connections included on the top of the PL die 300, enabling orders of magnitude more connections and, as a result, higher bandwidth between the data processing engines and the programmable elements. In some embodiments, this high-bandwidth coupling to programmable logic fabric included in the PL die 300 enables compute memory (e.g., SRAM or UltraRAM, also referred to as "URAM") included in each data processing engine to be distributed (e.g., cascaded) between multiple data processing engines, extending the amount of memory available for a given use case. Additionally, in some embodiments, each data processing engine (or tile of data processing engines) may be associated with substantially the same number and type(s) of programmable elements, enabling modular, "soft" intellectual property (IP) blocks to be "stamped" across the compute die and PL die 300 in a repeatable manner that generates predictable timing, bandwidth, and/or latency. Further, data processing engines (or tiles of data processing engines) may be connected to one another via the programmable logic fabric included in the PL die 300 in a specific topology, enabling, for example, advanced in-line processing, broadcasting, and other advanced functionality that cannot be efficiently performed via conventional systems that implement an edge interface.

FIG. 1 is a block diagram of a SoC 100 that includes a data processing engine (DPE) array 105 and programmable logic (PL) 125, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing circuits, cryptographic circuits, Forward Error Correction (FEC) circuits, or other specialized hardware for performing one or more specialized tasks.

In FIG. 1, the array 105 includes DPEs 110 that are all the same type (e.g., a homogeneous array). However, in another embodiment, the array 105 may include different types of circuits. For example, the array 105 may include digital signal processing circuits, cryptographic circuits, graphic processing circuits, and the like. Regardless of whether the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic (i.e., are hardened). One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, PL 125, a processor subsystem (PS) 130, input/output (I/O) 135, or memory controller circuit (MC) 140 which may be disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates PL 125 as one contiguous block, the SoC 100 may include multiple blocks of PL 125 (also referred to as logic sub-regions) that can be disposed adjacent to one another and/or at different locations in the SoC 100. Each logic sub-region (also referred to as a fabric sub-region) may include a set of configuration logic blocks (CLBs) that can include look-up tables (LUTs). In some embodiments, each logic sub-region is driven by a separate clock signal. In such embodiments, the logic sub-regions may be referred to as "clock regions." PL 125 may include hardware elements that form a field programmable gate array (FPGA), programmable logic devices (PLD), and/or any other type of logic device that is reprogrammable. However, in other embodiments, the SoC 100 may not include any PL 125—e.g., the SoC 100 may be an application-specific integrated circuit (ASIC).

Figure 2:
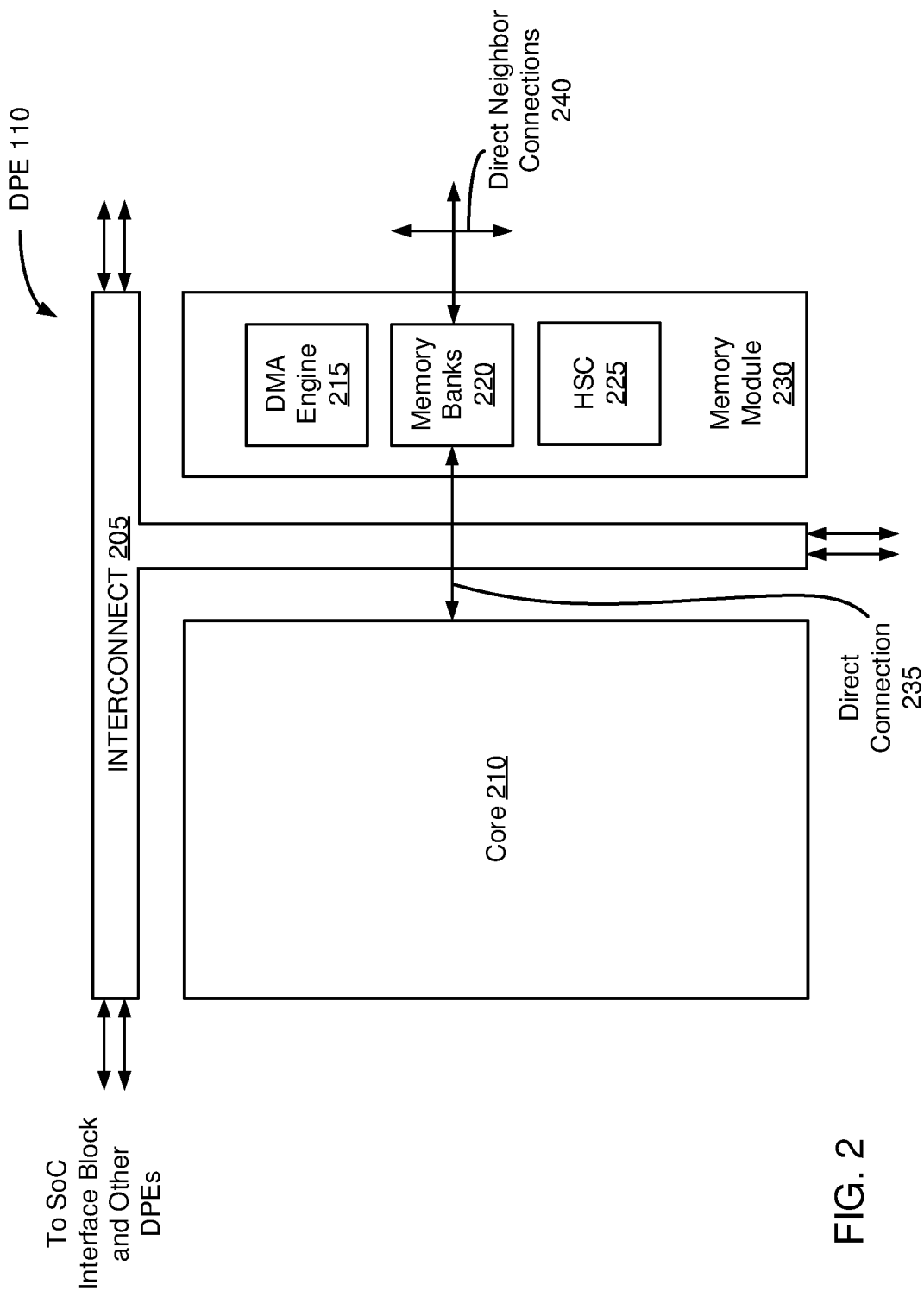
FIG. 2 is a block diagram of a data processing engine in the data processing engine array, according to an example.

FIG. 2 is a block diagram of a DPE 110 in the DPE array 105 illustrated in FIG. 1, according to an example. The DPE 110 includes an interconnect 205, a core 210, and a memory 230. The interconnect 205 permits data to be transferred from the core 210 and the memory 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 rely on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory 230 to the neighboring DPEs 110 or the SoC interface block 115. Once configured, the core 210 and the memory 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the circuit type. That is, the cores in a digital signal processing circuit, cryptographic circuit, or FEC may be different.

The memory 230 includes a DMA circuit 215, memory banks 220, and hardware synchronization circuitry (HSC) 225 or other type of hardware synchronization block. In one embodiment, the DMA circuit 215 enables data to be received by, and transmitted to, the interconnect 205. That is, the DMA circuit 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory 230 which is in turn coupled to the memory banks 220.

In one embodiment, the memory 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA circuit 215) requests a lock acquire to the HSC 225 when it wants to read or write to the memory banks 220 (e.g., when the core/DMA circuit want to "own" a buffer, which is an assigned portion of the memory banks 220. If the core or DMA circuit does not acquire the lock, the HSC 225 will stall (e.g., stop) the core or DMA circuit from accessing the memory banks 220. When the core or DMA circuit is done with the buffer, they release the lock to the HSC 225. In one embodiment, the HSC 225 synchronizes the DMA circuit 215 and core 210 in the same DPE 110 (e.g., memory banks 220 in one DPE 110 are shared between the DMA circuit 215 and the core 210). Once the write is complete, the core (or the DMA circuit 215) can release the lock which permits cores in neighboring DPEs to read the data.

Figure 3:
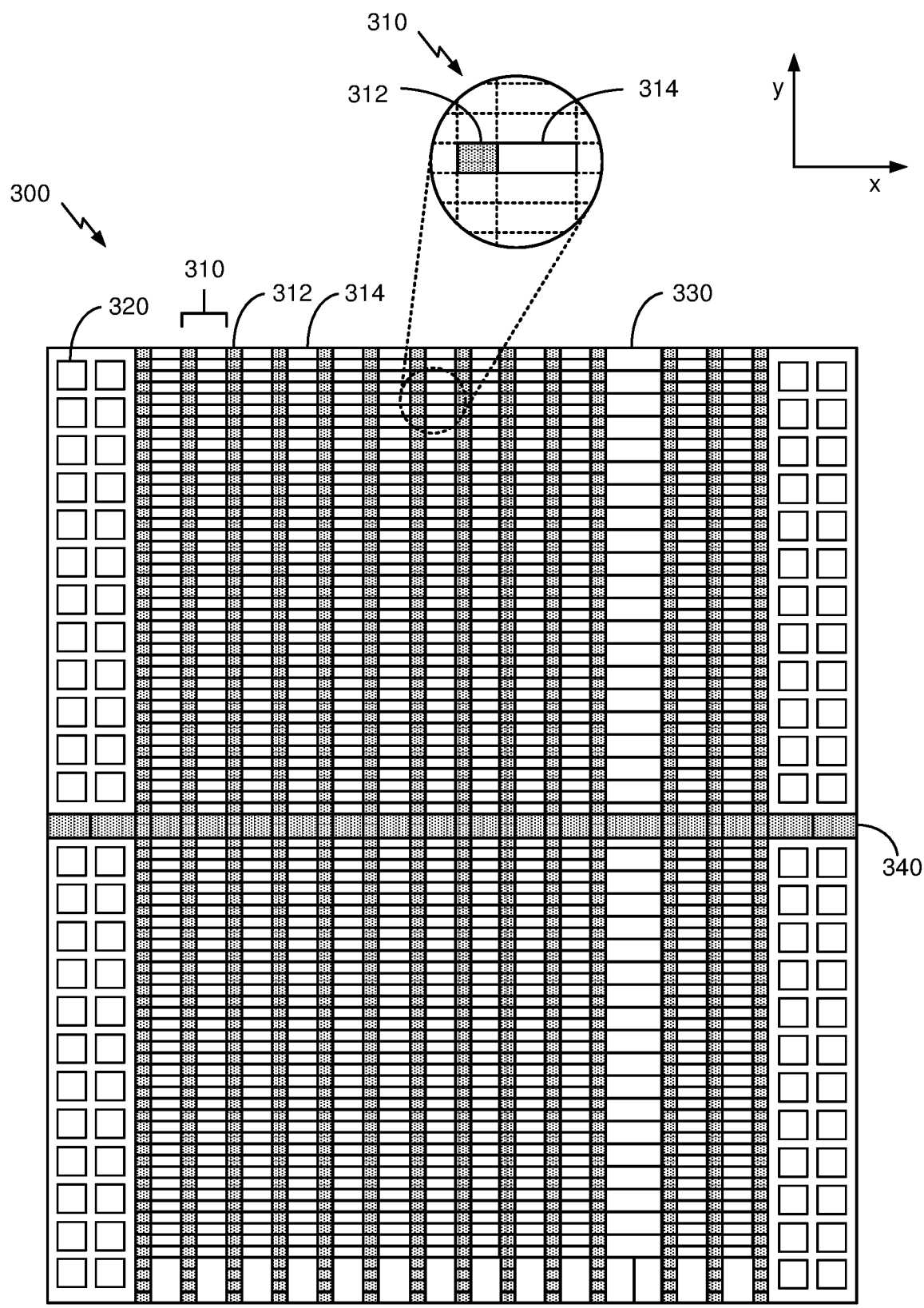
FIG. 3 illustrates a field programmable gate array (FPGA) implementation of a programmable logic (PL) die, according to an example

FIG. 3 illustrates a field programmable gate array (FPGA) implementation of a programmable logic (PL) die 300, according to an example. The PL die 300 includes configurable logic blocks (CLBs) 310, random access memory blocks (BRAMs) 320, digital signal processing blocks (DSPs) 330, and interconnect 340. In some embodiments, each CLB 310 includes one or more programmable interconnect elements (INTs) 312 and one or more configurable logic elements (CLEs) 314 that can be programmed to implement user logic. The PL die 300 may further include other components, such as input/output blocks (IOBs), analog-to-digital converters (ADCs), system monitoring logic, and so forth. Although FIG. 3 illustrates the CLBs 310, BRAMs 320, and DSPs 330 arranged in columns and rows, any other configuration including any number of CLBs 310, BRAMs 320, and DSPs 330 may be implemented.

In some embodiments, each programmable interconnect element 312 includes connections to input and output terminals of a CLE 314 within the same CLB 310. Each programmable interconnect element 312 can also include connections to adjacent programmable interconnect element(s) 312 and connections to general routing resources between logical blocks included in the PL die 300. A BRAM 320 can include a BRAM logic element (BRL) and one or more programmable interconnect elements (not shown). A DSP 320 can include a DSP logic element (DSPL) in addition to an appropriate number of programmable interconnect elements.

In some embodiments, interconnect 340 may be configured as a horizontal area near the center of the PL die 300 and may be used for configuration, clock, and other control logic. The PL die 300 may further include additional logic blocks that disrupt the regular columnar structure making up a large part of the programmable logic. The additional logic blocks can be programmable blocks and/or dedicated logic.

Note that FIG. 3 is intended to illustrate only an exemplary programmable logic architecture. For example, the numbers of logic blocks (e.g., CLBs 310) in a column or row, the relative width of the columns and rows, the number and order of columns and rows, the types of logic blocks included in the columns or rows, the relative sizes of the logic blocks, and the interconnect/logic implementations included at the top of FIG. 3 are exemplary.

Tiled Compute and Programmable Logic Array

Increasingly, high-performance computing systems implement large numbers of data processing engines and programmable logic (PL) (e.g., a field-programmable gate array or "FPGA") within the same die and/or integrated circuit (IC) package. Such systems generally provide a flexible and highly parallel computing interface that can be adapted to a wide variety of applications. However, the architectures implemented in current systems suffer from a number of drawbacks.

For example, such systems commonly implement network-based communications, such as a network-on-chip (NoC) interface, in which data processing engines communicate with programmable logic and other IC components via an edge interface. For example, an array of data processing engines may be positioned along one edge of an interface (e.g., a NoC interface), and programmable logic may be positioned along another edge of the interface. One drawback of this configuration is that, as more and more processing elements need to communicate through an edge interface, the routing channels associated with the edge interface become saturated. As the routing channels approach saturation, routing congestion increases, limiting bandwidth and/or increasing latency between data processing engines and programmable logic. Additionally, due to routing congestion, data processing engines and programmable logic positioned far away from an edge of the interface may have difficulty meeting timing closure requirements, effectively limiting the total number of resources that can be utilized for a given process. Additionally, data processing engines and programmable logic positioned far away from an edge of the interface may have difficulty meeting timing closure requirements, effectively limiting the total number of resources that can be utilized for a given process.

In various embodiments, the tiled compute and programmable logic array techniques disclosed herein vertically align, in a three-dimensional die stack, data processing engines (e.g., DPEs 110) included in a compute die with programmable elements (e.g., CLBs 310) included in a programmable logic (PL) die 300. Electrical connections (e.g., through-silicon vias) included on the bottom of the compute die may be pitch-matched and bonded to electrical connections included on the top of the PL die 300, enabling orders of magnitude more connections and, as a result, higher bandwidth between the data processing engines and the programmable elements. In some embodiments, this high-bandwidth coupling to programmable logic fabric included in the PL die 300 enables compute memory (e.g., SRAM or UltraRAM, also referred to as "URAM") included in each data processing engine to be distributed (e.g., cascaded) between multiple data processing engines, extending the amount of memory available for a given use case. Additionally, in some embodiments, each data processing engine (or tile of data processing engines) may be associated with substantially the same number and type(s) of programmable elements, enabling modular, "soft" intellectual property (IP) blocks to be "stamped" across the compute die and PL die 300 in a repeatable manner that generates predictable timing, bandwidth, and/or latency. Further, data processing engines (or tiles of data processing engines) may be connected to one another via the programmable logic fabric included in the PL die 300 in a specific topology, enabling, for example, advanced in-line processing, broadcasting, and other advanced functionality that cannot be efficiently performed via conventional systems that implement an edge interface. Such techniques are described below in further detail in conjunction with FIGS. 3, 4A-4B, 5, 6A-6B, 7, and 8A-8C.

Figure 4A:
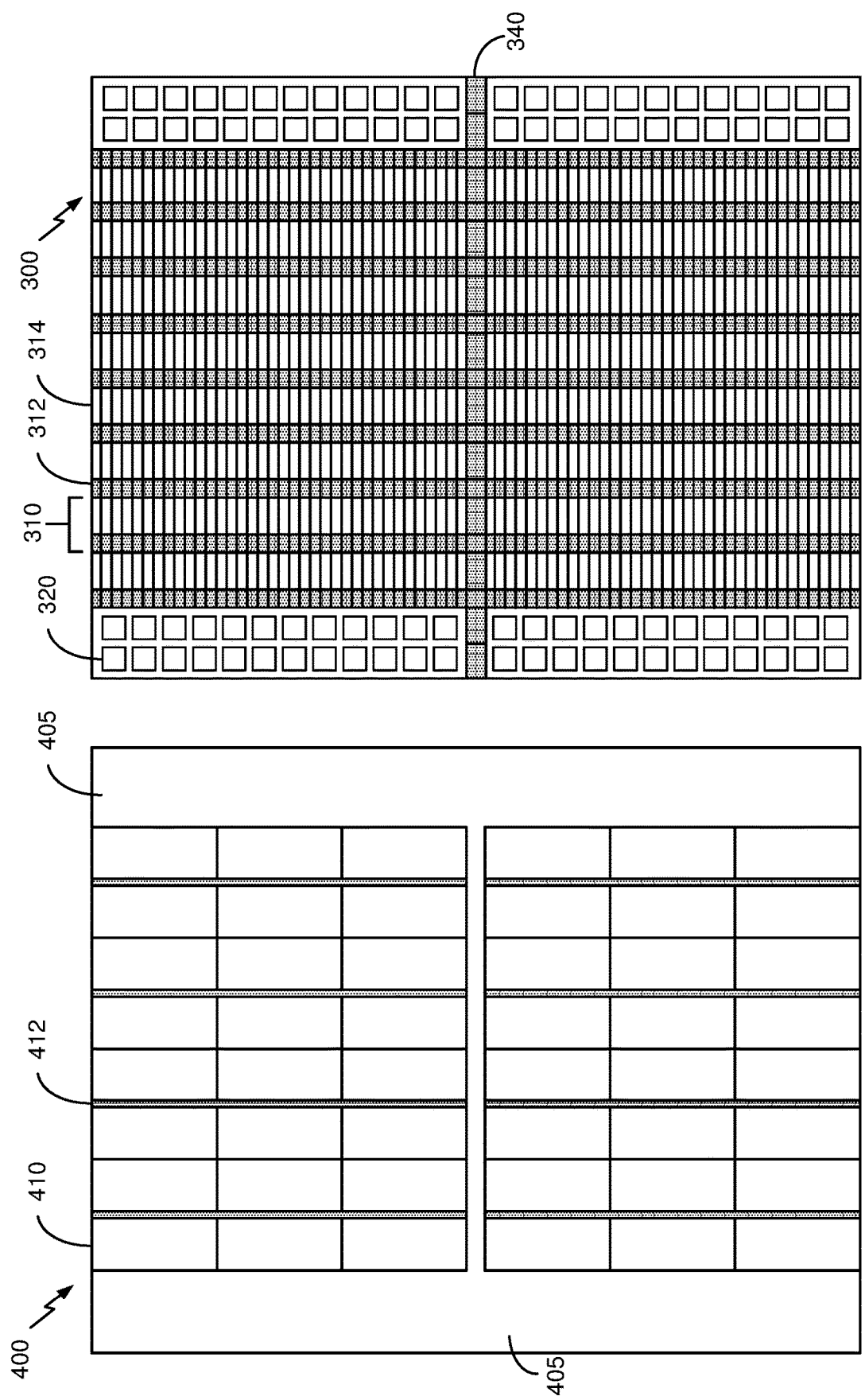
FIG. 4A illustrates a schematic elevation view of a compute die and PL die, according to an example.
Figure 4B:
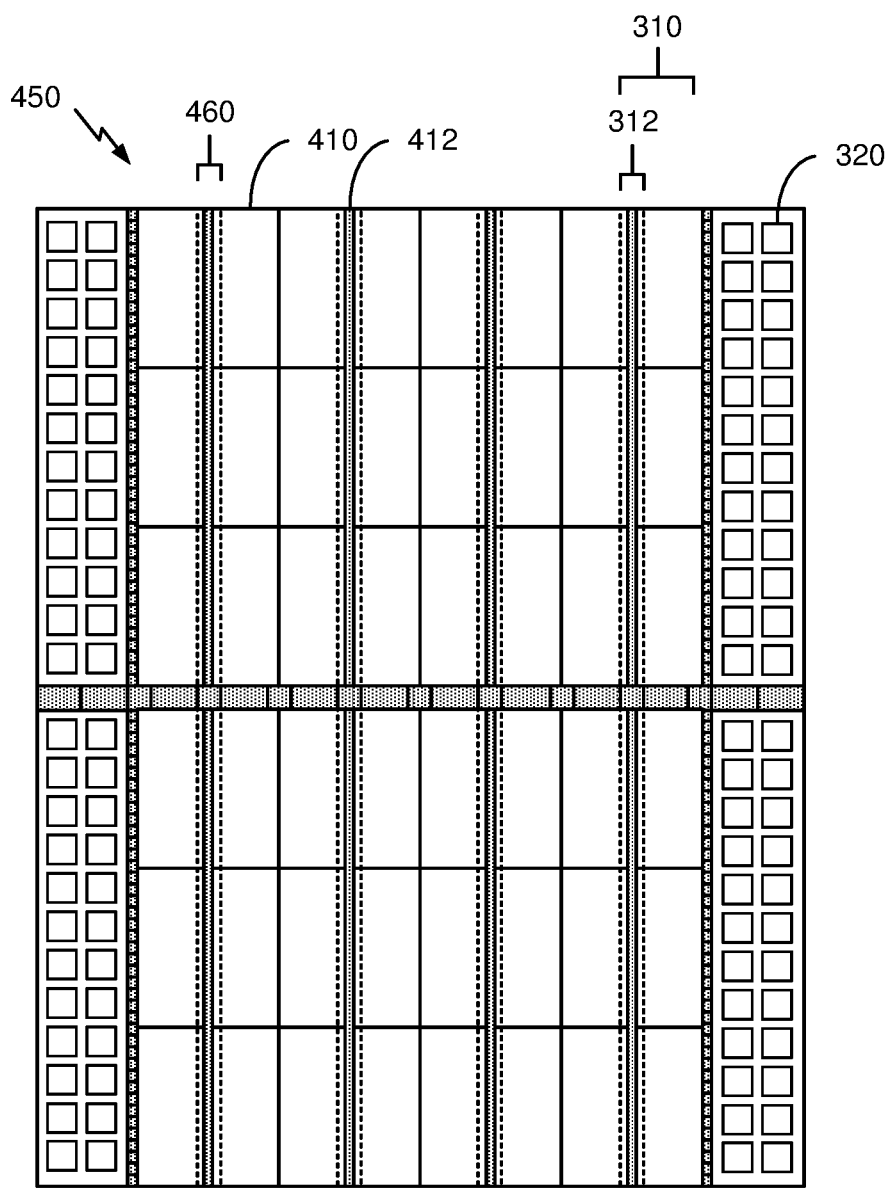
FIG. 4B illustrates a schematic elevation view of a three-dimensional (3D) die stack that includes compute die and PL die, according to an example.

FIG. 4A illustrates a schematic elevation view of a compute die 400 and PL die 300, according to an example. FIG. 4B illustrates a schematic elevation view of a three-dimensional (3D) die stack 450 that includes compute die 400 and PL die 300, according to an example.

As shown in FIG. 4A, compute die 400 includes a plurality of data processing engines 410 (e.g., DPEs 110) and interconnect 412. Interconnect 412 permits communication between the compute die 400 and the PL die 300. In some embodiments, interconnect 412 may be positioned between two or more data processing engines 410 and may include TSVs, FIFOs, and/or level shifters for domain crossing. The compute die 400 may include regions of white space 405 where no circuitry is fabricated. Alternatively, in some embodiments, most or all of the compute die 400 may include circuitry, such as data processing engines 410 and interconnect 412.

As shown in FIG. 48, when the compute die 400 is stacked on top of the PL die 300 and the resulting 3D die stack 450 is viewed from above, each data processing engine 410 is electrically connected (e.g., at a die-to-die interface between the PL die 300 and compute die 400) to substantially the same number of programmable elements (e.g., CLBs 310). In various embodiments, the 3D die stack 450 includes a plurality of tiles, where each tile includes N total DPEs 410 (in the compute die 400) that are electrically connected to M total CLBs 210 (in the PL die 300). In some embodiments, each tile may include an integer number N total DPEs 410 that are electrically connected to an integer number M total CLBs 210, where electrical connections of each DPE 410 are electrically connected (e.g., at a die-to-die interface between the PL die 300 and the compute die 400) to electrical connections of the same number of CLBs 210. For example, the 3D die stack 450 shown in FIG. 4B may include 8 tiles, where each tile includes 6 DPEs 410 (e.g., 2×3 DPEs, 3×2 DPEs, 1×6 DPEs, 6×1 DPEs, etc.) that are electrically connected—at the die-to-die interface between the PL die 300 and compute die 400—to 72 CLBs 210 (e.g., 2×36 CLBs, 36×2 CLBs, 1×72 CLBs, 72×1 CLBs, etc.). In another example, each tile may include 24 DPEs 410 (e.g., 6×4 DPEs, 4×6 DPEs, 3×8 DPEs, 8×3 DPEs, etc.) and 288 CLBs (e.g., 4×72 CLBs, 72×4 CLBs, etc.). In general, each tile may include any integer number M of CLBs 210 and any integer number N of DPEs 410 having any dimensions, such that M and N are the same for each tile in the 3D die stack 450.

For clarity of illustration, white space 405 has been omitted from FIG. 4B to enable components sitting below the compute die 400 to be more easily viewed. In some embodiments, each data processing engine 410 (or tile of data processing engines 410) and the programmable elements with which it is vertically aligned and/or electrically connected form a module that operates in a similar manner to generate predictable timing, bandwidth, and/or latency. Although the PL die 300 shown in FIG. 4A has a uniform, uninterrupted structure of CLBs 310 and, for example, does not include any DSPs 330, in some embodiments, DSPs 330 and/or other elements may be included in the PL die 300 (e.g., as shown in FIG. 3) and/or compute die 400 while still maintaining a substantially uniform allocation of programmable elements to each data processing engine 410.

Figure 5:
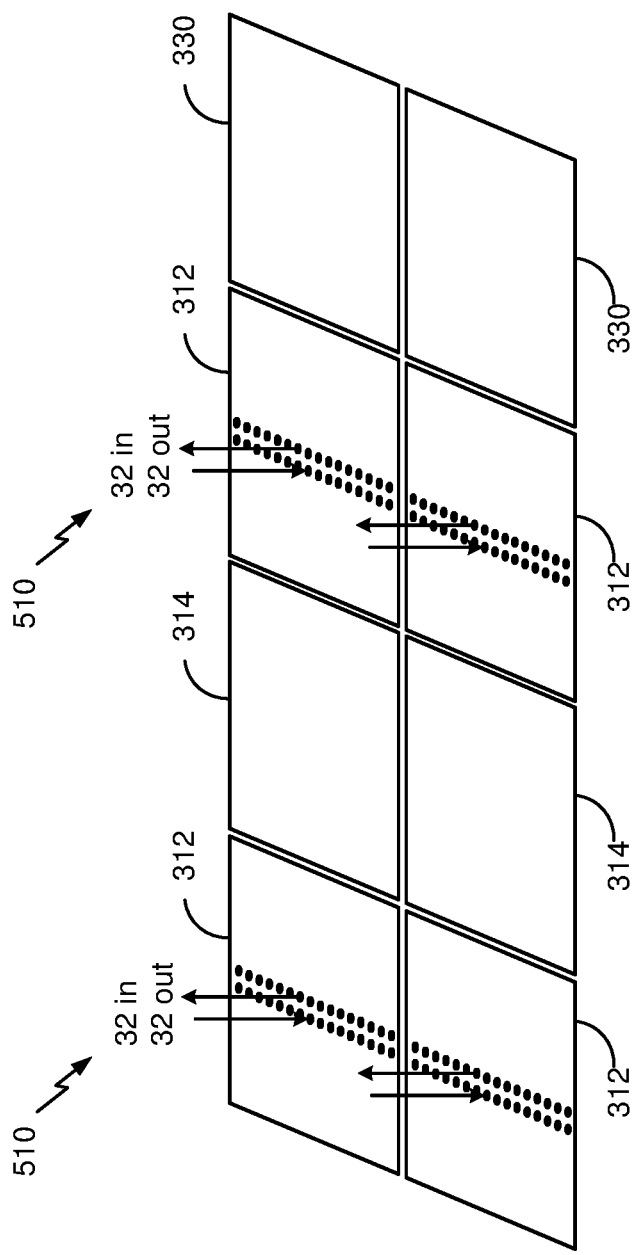
FIG. 5 illustrates input and output connections formed in the z-direction between programmable interconnect elements included in the PL die and a data processing engine and/or interconnect included in compute die, according to an example.
Figure 5:
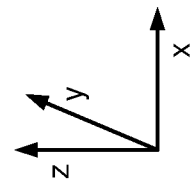

In various embodiments, interconnect 412 included in the compute die 400 may optionally be vertically aligned with an interconnect (e.g., programmable interconnect elements 312) included in the PL die 300 such that electrical connections can be more easily formed in a z-direction between the compute die 400 and the PL die 300. In some embodiments, the compute die 400 and the PL die 300 are electrically connected by hybrid oxide bonding through-silicon vias (TSVs) included on a bottom side of the compute die 400 to electrical connections (e.g., one or more metallization layers) included on a top side of the PL die 300. For example, as shown in FIG. 5, multiple input and output connections (e.g., 32 input and 32 output connections) may be formed in the z-direction between each programmable interconnect element 312 included in the PL die 300 and a data processing engine 410 and/or interconnect 412 included in compute die 400. In some embodiments, each data processing engine 410 is directly coupled to substantially the same number of programmable interconnect elements 312, where directly coupled means that a TSV (or similar connection) of the data processing engine 410 on the bottom of the compute die 400 couples to a programmable interconnect element 312 without passing through any intermediate logic (e.g., another programmable interconnect element 312, a different CLB 310, etc.) in PL die 300. Although FIG. 5 illustrates a CLE 314 and a DSP 330 positioned adjacent to the programmable interconnect elements 312, in various embodiments, any type(s) of component (e.g., two CLEs 314, two DSPs 330, etc.) may be implemented in conjunction with the programmable interconnect elements 312.

Figure 6A:
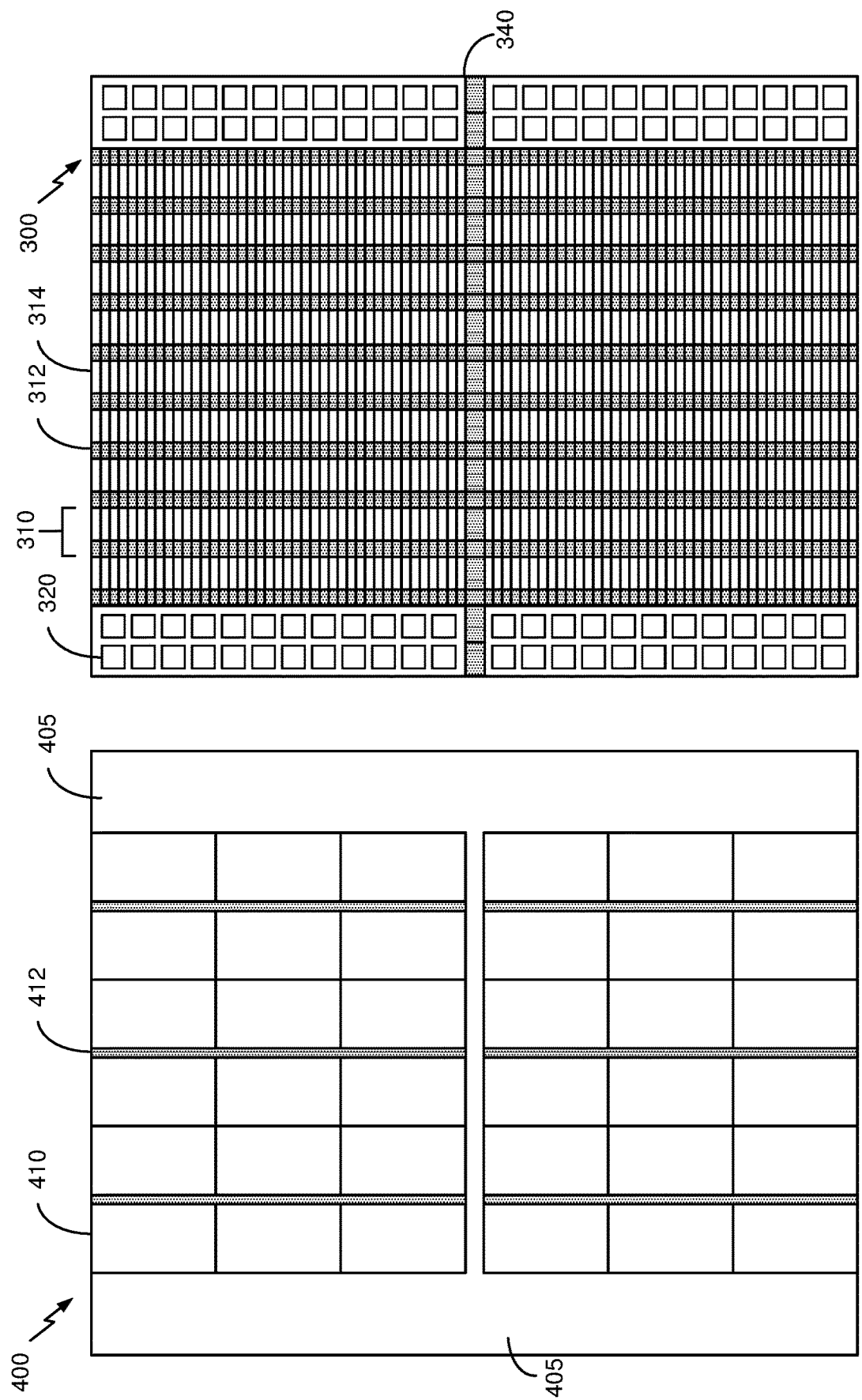
FIG. 6A illustrates a schematic elevation view of a compute die and PL die, according to an example.
Figure 6B:
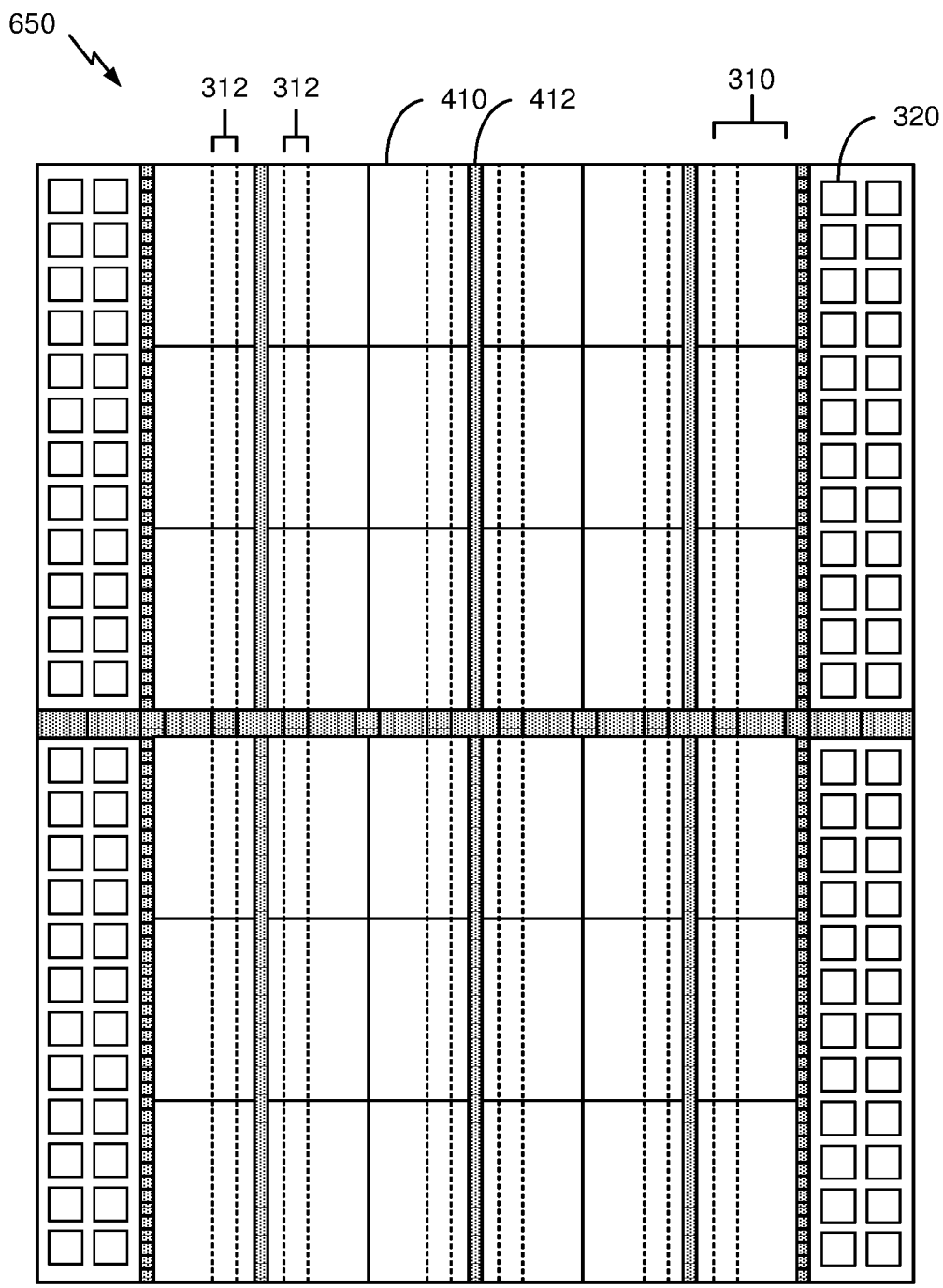
FIG. 6B illustrates a schematic elevation view of a three-dimensional (3D) die stack in which an interconnect included in compute die does not vertically align with programmable interconnect elements included in PL die, according to an example.

FIG. 6A illustrates a schematic elevation view of a compute die 400 and PL die 300, according to an example. FIG. 6B illustrates a schematic elevation view of a three-dimensional (3D) die stack 650 in which an interconnect 412 included in compute die 400 does not vertically align with programmable interconnect elements 312 included in PL die 300, according to an example. In some embodiments, TSVs disposed on the bottom side of the compute die 400 are aligned to the interconnects 412 disposed on the upper side of the PL die 300, enabling communication between the compute die 400 and the PL die 300. Techniques for electrically connecting the compute die 400 and the PL die 300 when the interconnect(s) 412 included in compute die 400 do not vertically align with the programmable interconnect element(s) 312 included in PL die 300 are described below in further detail in conjunction with FIG. 7.

As shown in FIG. 6B, when the compute die 400 is stacked on top of the PL die 300 to form 3D die stack 650, each data processing engine 410 is vertically aligned with substantially the same number of programmable elements (e.g., CLBs 310). Similar to FIG. 4B, for clarity of illustration, white space 405 has been omitted from FIG. 6B to enable components sitting below the compute die 400 to be more easily viewed. Although the PL die 300 shown in FIG. 6A has a uniform, uninterrupted structure of CLBs 310 and, for example, does not include any DSPs 330, in some embodiments, DSPs 330 and/or other elements may be included in the PL die 300 (e.g., as shown in FIG. 3) and/or compute die 400 while still maintaining a substantially uniform allocation of programmable elements to each data processing engine 410.

Figure 7:
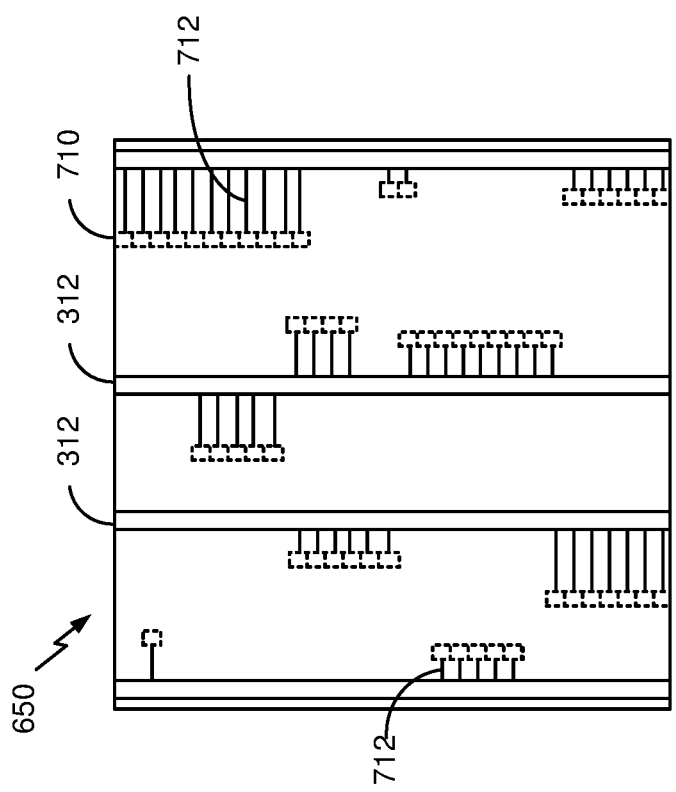
FIG. 7 illustrates metal tracks fabricated between z-interface cells included in compute die and an interconnect included in the PL die, according to an example.
Figure 7:
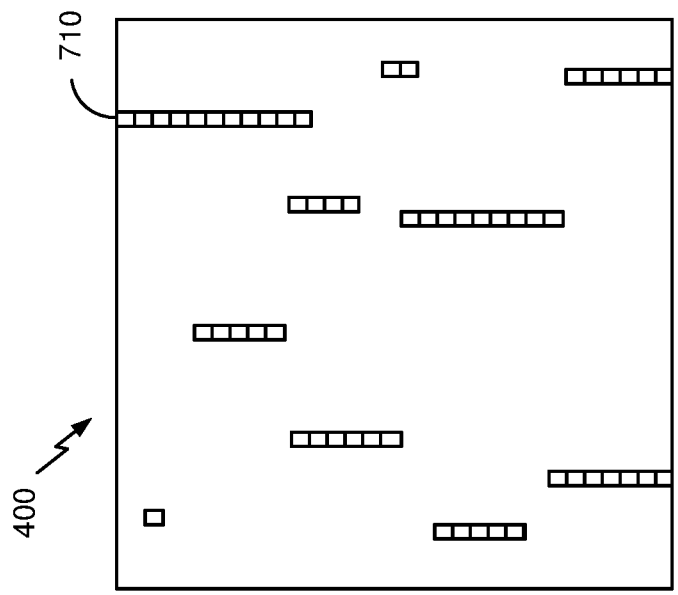

In various embodiments, interconnect 412 included in the compute die 400 is not vertically aligned with (or is only partially vertically aligned with) an interconnect (e.g., programmable interconnect elements 312) included in the PL die 300. In such embodiments, electrical connections can be routed in the x-direction and/or y-direction via one or more metal layers on and/or within the compute die 400 to enable interconnect(s) 412 to be vertically connected (e.g., via TSVs disposed at the die-to-die interface on the bottom side of the compute die 400) to interconnect(s) included in the PL die 300. For example, as shown in FIG. 7, a bottom side of the compute die 400 may include z-interface cells 710, and metal tracks 712 may be fabricated between the z-interface cells 710 and an interconnect (e.g., programmable interconnect elements 312) included in the PL die 300. Accordingly, such embodiments provide additional flexibility with respect to the vertical alignment between components included in the PL die 300 and compute die 400.

Figure 8B:
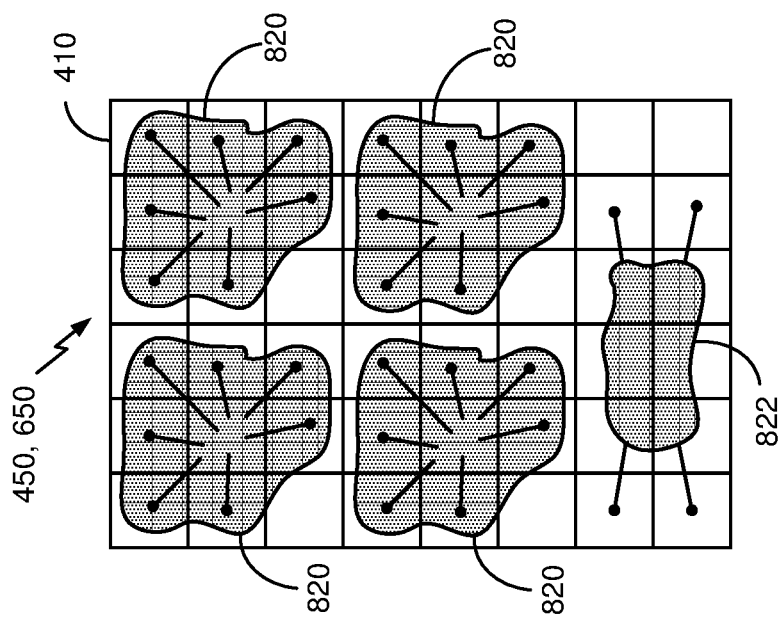
FIGS. 8A-8C illustrate techniques for programming a 3D die stack, according to several examples.
Figure 8A:
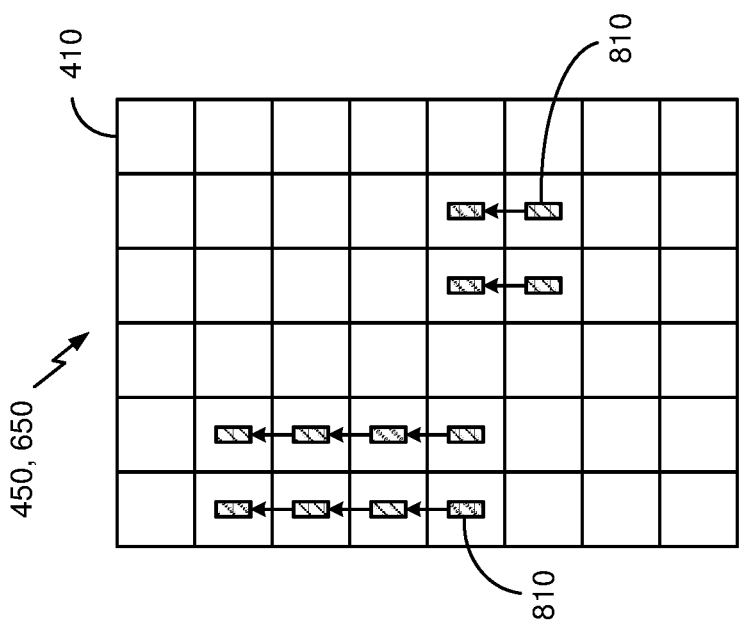
Figure 8C:
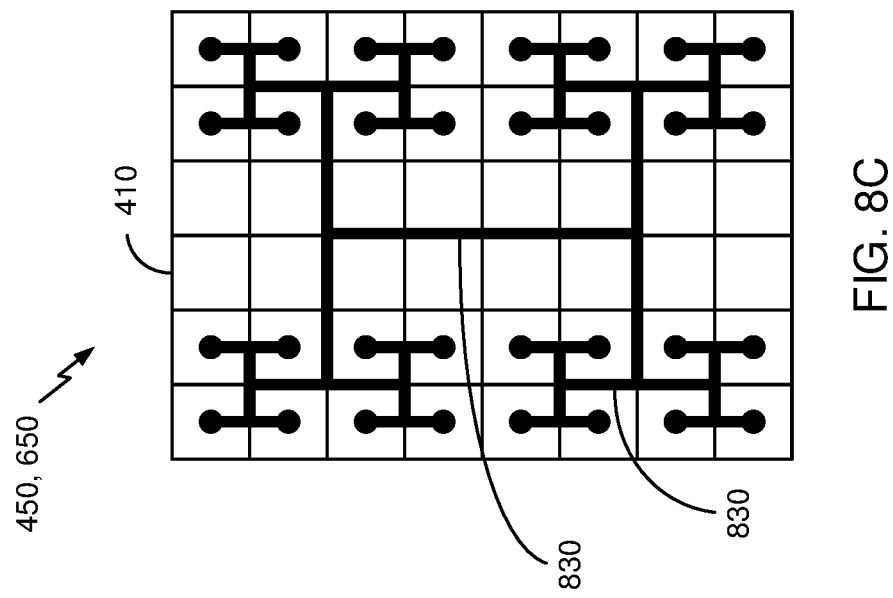

FIGS. 8A-8C illustrate techniques for programming a 3D die stack 450, 650, according to an example. For example, FIG. 8A illustrates a technique for high-bandwidth distributed compute memory 810, according to an example. Conventionally, each data processing engine 410 may include a fixed amount of high-speed memory 810 (e.g., SRAM, URAM, etc.) built into its array. Because the memory 810 is not extendable, use cases that require more than the fixed amount of memory 810 generally can access memory 810 only in adjacent arrays that are in close proximity to the data processing engine 410 (or tile of data processing engines 410) due to timing closure requirements. Alternatively, the fixed amount of memory 810 included in each data processing engine 410 can be increased to support the use case(s), which may significantly increase die area requirements. Accordingly, in various embodiments, the high-bandwidth coupling between the compute die 400 and the programmable logic fabric included in the PL die 300 enables the fixed memory 810 included in each data processing engine to be distributed (e.g., cascaded) between multiple data processing engines, significantly extending the amount of memory 810 available for a given use case. Additionally, bit depth and/or bit width may be user-programmable, providing flexibility for a wide range of applications. In some embodiments, larger RAM modules included in the compute die 400 may be interleaved in order to improve memory speed.

As shown in FIG. 8B, functions that do not target well to a particular compute architecture (e.g., integer operations, trigonometry functions, etc.) and/or operations for which there is no fixed-function hardware may be synthesized directly underneath a data processing engine 410 (or a tile of data processing engines 410) in the programmable logic fabric of the PL die 300. For example, as shown in FIG. 8B, a tile of nine data processing engines 410 and resources included in PL die 300 (e.g., CLBs 310, BRAM 320, DSPs 330, etc.) underlying the nine data processing engines 410 may be implemented to execute each instance of function 820, and a tile of ten data processing engines 410 and resources included in PL die 300 underlying the ten data processing engines 410 may be implemented to execute an instance of function 822. As another example, a tile of X data processing engines 410 and resources included in PL die 300 underlying the X data processing engines 410 may be implemented to execute any function that is not ubiquitous enough and/or not used frequently enough to warrant using the silicon area of every tile. In such implementations, the programmable logic fabric included in the PL die 300 may serve as a coprocessor to the data processing engines 410 included in the compute die 400, enabling a modular, fully-customizable function (e.g., ReLU/sigmoid, encryption/decryption, search, compression, etc.) to be tiled multiple times across a compute die with predictable and repeatable results. Such configurations may also enable variable precision copies of fixed-precision data processing engine 410 functions and user-programmed instruction set extensions to be created.

As shown in FIG. 8C, customized compute interconnects can be generated to connect data processing engines 410 to each other in a specific topology via resources included in PL die 300 (e.g., CLBs 310, BRAM 320, DSPs 330, etc.). The compute interconnects may be lower latency than a conventional 2D, edge interface. The interconnects may enable, for example, dedicated point-to-point connections between data processing engines 410 and complex compute interconnect topologies (e.g., torus, hypercube, fat tree, etc.). Additionally, the customized compute interconnects may enable in-line processing to be performed along a path 830 of data processing engines 410, broadcasting in a fully-connected layer, and other advanced functionality that cannot be efficiently performed via conventional systems that implement an edge interface.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A three-dimensional (3D) die stack, comprising:
  a programmable logic (PL) die comprising a plurality of configurable blocks and a plurality of first electrical connections on a top side of the PL die; and
  a compute die stacked on top of the PL die, the compute die comprising a plurality of data processing engines and a plurality of second electrical connections on a bottom side of the compute die,
  wherein each configurable block included in the plurality of configurable blocks comprises a programmable interconnect, and each data processing engine included in the plurality of data processing engines is electronically connected to substantially the same number of programmable interconnects included in the plurality of configurable blocks, and
  wherein the three-dimensional die stack includes a plurality of tiles, each tile comprising M configurable blocks included in the plurality of configurable blocks and N data processing engines included in the plurality of data processing engines.

2. The 3D die stack of claim 1, wherein each data processing engine included in the plurality of data processing engines is associated with same number of configurable blocks included in the plurality of configurable blocks.

3. The 3D die stack of claim 1, wherein the second electrical connections of each data processing engine included in the plurality of data processing engines are electrically connected, at a die-to-die interface between the PL die and the compute die, to the first electrical connections of the same number of configurable blocks included in the plurality of configurable blocks.

4. The 3D die stack of claim 1, wherein each data processing engine included in the plurality of data processing engines is directly coupled to substantially the same number of programmable interconnects included in the plurality of configurable blocks.

5. The 3D die stack of claim 1, wherein each configurable block included in the plurality of configurable blocks comprises a configurable logic element, and each data processing engine included in the plurality of data processing engines is associated with substantially the same number of configurable logic elements included in the plurality of configurable blocks.

6. The 3D die stack of claim 1, wherein the PL die comprises a field-programmable gate array (FPGA) fabric including the plurality of configurable blocks.

7. The 3D die stack of claim 1, wherein the plurality of first electrical connections are hybrid oxide bonded to the plurality of second electrical connections.

8. The 3D die stack of claim 1, wherein the plurality of first electrical connections and the plurality of second electrical connections have a pitch of less than 5 microns.

9. The 3D die stack of claim 1, wherein the plurality of second electrical connections comprise through-silicon vias (TSVs).

10. A computing system, comprising:
  a memory; and
  a three-dimensional (3D) die stack coupled to the memory and comprising:
    a programmable logic (PL) die comprising a plurality of configurable blocks and a plurality of first electrical connections on a top side of the PL die; and
    a compute die stacked on top of the PL die, the compute die comprising a plurality of data processing engines and a plurality of second electrical connections on a bottom side of the compute die,
    wherein each configurable block included in the plurality of configurable blocks comprises a programmable interconnect, and each data processing engine included in the plurality of data processing engines is electronically connected to substantially the same number of programmable interconnects included in the plurality of configurable blocks, and
    wherein the three-dimensional die stack includes a plurality of tiles, each tile comprising M configurable blocks included in the plurality of configurable blocks and N data processing engines included in the plurality of data processing engines.

11. The computing system of claim 10, wherein each data processing engine included in the plurality of data processing engines is associated with same number of configurable blocks included in the plurality of configurable blocks.

12. The computing system of claim 10, wherein the second electrical connections of each data processing engine included in the plurality of data processing engines are electrically connected, at a die-to-die interface between the PL die and the compute die, to the first electrical connections of the same number of configurable blocks included in the plurality of configurable blocks.

13. The computing system of claim 10, wherein each data processing engine included in the plurality of data processing engines is directly coupled to substantially the same number of programmable interconnects included in the plurality of configurable blocks.

14. The computing system of claim 10, wherein each configurable block included in the plurality of configurable blocks comprises a configurable logic element, and each data processing engine included in the plurality of data processing engines is associated with substantially the same number of configurable logic elements included in the plurality of configurable blocks.

15. The computing system of claim 10, wherein the PL die comprises a field-programmable gate array (FPGA) fabric including the plurality of configurable blocks.

16. The computing system of claim 10, wherein the plurality of first electrical connections are hybrid oxide bonded to the plurality of second electrical connections.

17. The computing system of claim 10, wherein the plurality of first electrical connections and the plurality of second electrical connections have a pitch of less than 5 microns.

18. The computing system of claim 10, wherein the plurality of second electrical connections comprise through-silicon vias (TSVs).

\* \* \* \* \*